No. 842,857. PATENTED FEB. 5, 1907.
J. B. CARROLL.
ADVERTISING CARD.
APPLICATION FILED SEPT. 17, 1906.
Witnesses: Inventor:
John B. Carroll,
by Byrnes & Townsend,
Att'ys.

UNITED STATES PATENT OFFICE.

JOHN B. CARROLL, OF CHICAGO, ILLINOIS.

ADVERTISING-CARD.

No. 842,857. Specification of Letters Patent. Patented Feb. 5, 1907.

Application filed September 17, 1906. Serial No. 334,928.

*To all whom it may concern:*

Be it known that I, JOHN B. CARROLL, a citizen of the United States, residing at Chicago, in the county of Cook and State of Illinois, have invented certain new and useful Improvements in Advertising-Cards, of which the following is a specification.

This invention relates to advertising-cards or devices, the object of the invention being to combine with any desired advertising matter upon a card or the like a figure or device which will arrest and hold the attention, while at the same time possessing some measure of utility as an accurate register of the condition of the weather with respect to wind, rain, &c.

In its preferred embodiment the invention comprises a card having thereon an incomplete pictorial representation of an animal, there being attached to the picture and projecting from the plane thereof a tail of fibrous material, so mounted as to be capable of free movement in response to atmospheric currents. In connection with this combined representation are tabulated directions correlating the condition of the same with certain atmospheric phenomena, as above described.

A preferred form of the invention is illustrated in elevation in the accompanying drawing, wherein 1 represents a card having thereon an incomplete pictorial representation of an animal 2, as a mule, the tail being omitted from the picture. The tail 3 comprises a twisted or untwisted strand of cord, string, twine, rope, or the like having a small area of attachment to the card to permit entire freedom of motion, as above mentioned.

Preferably the tail is drawn through a small aperture in the card and secured to the reverse thereof in any suitable manner. Adjacent the figure are printed directions, (shown at 4,) correlating the condition of the tail with certain more or less obvious atmospheric phenomena.

I claim—

An advertising-card having indicated thereon an incomplete pictorial representation of an animal, the tail of the animal being attached to the card in such manner as to secure freedom of movement and projecting from the plane thereof, and directions correlating the conditions and movement of the tail with atmospheric phenomena, substantially as described.

In testimony whereof I affix my signature in presence of two witnesses.

JOHN B. CARROLL.

Witnesses:
C. A. CRAFT,
C. W. CREIGHTON.